Figure 1:
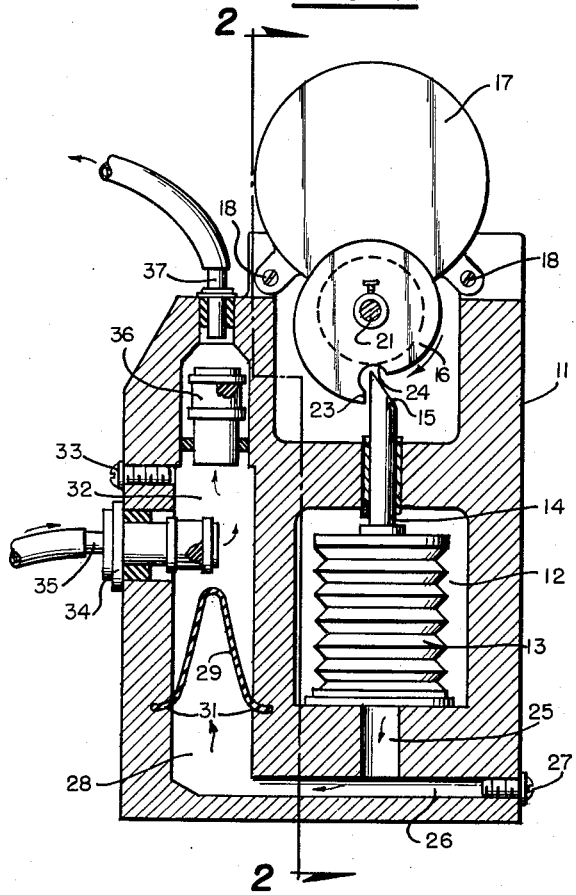

Jan. 15, 1963   H. E. SAUNDERS ETAL   3,073,246
PUMP
Filed Sept. 8, 1960

INVENTORS
Hugh E. Saunders
Robert G. Kling

BY *William Grobman*

ATTORNEY

United States Patent Office 3,073,246
Patented Jan. 15, 1963

1

3,073,246
PUMP
Hugh E. Saunders, Moline, and Robert G. Kling, Rock Island, Ill., assignors to Mast Development Company, Inc., Davenport, Iowa
Filed Sept. 8, 1960, Ser. No. 54,749
5 Claims. (Cl. 103—44)

This invention relates to fluid pumps, and, more particularly, to positive displacement pumps operating at slow steady rates.

There are many times when it is desirable or necessary to displace a fluid, and in particular, a liquid, at a very slow, but uniform and often calibrated, rate. In the past, gravity was often used as the motive force and manually adjustable clamps or valves served to control the rate at which liquids were fed. This is particularly true when the displacement of the liquid was accomplished over a long period of time, often hours. One such circumstance which comes readily to mind, is the intravenous injection of solutions, blood plasma, and the like. These must be accomplished over a period of hours at a slow, substantially constant rate. In order to render the rate as uniform as possible, the reservoir of liquid to be injected, when a gravity feed is used, is placed at a height several times greater than the change in height of the solution as it is injected. Even so, the change in the head with the gradual depression of the level of solution in the reservoir causes significant variations in the rate of flow.

In chemical tests where a reagent solution must be slowly and continuously added to a proceeding reaction at a constant rate, gravity feeds have also been used. In such systems, the reagent is usually added by drops, the drops being inherently of substantially uniform volume. The rate at which the drops are added is continually checked to insure uniformity. Again, as the level of the reagent in the reservoir drops, the rate of flow drops unless the system is modified to compensate. To maintain the changes in flow rate as uniform as possible over as long a period as possible, the height of the reservoir is again made several times that of the change in liquid level.

Even when extreme care is exercised in operating such a gravity system, the resulting solution flow is subject to great variation and complete cessation of flow. The flow is affected by variables such as the solution characteristics, flow path characteristics, and ambient temperature. Under such conditions a truly steady flow rate is rarely maintained over a period of several hours. Accurate control of the rate of flow is indeed extremely difficult.

It can be seen that gravity feeds of liquids at a substantially constant rate require a large amount of space, particularly vertically. To decrease the space requirements motorized syringes have been used, where a constant speed motor gradually drives the piston of a syringe to displace a desired liquid at a slow and constant rate. The syringe pumps operated well except for the fact that the supply of liquid in such a device is limited by the capacity of the syringe itself. In addition, where a large diameter syringe was used to provide an adequate storage volume, seepage between the piston and cylinder walls was experienced, destroying the calibration of the pump.

It is, therefore, an object of this invention to provide a new and improved pump.

It is another object of this invention to provide a new and improved positive displacement pump for the transmission of liquids at a slow, constant rate over an extended interval of time.

2

It is a further object of this invention to provide a new and improved pump for the displacement of liquids from a separate reservoir at a constant, but selectable, rate.

Figure 2:
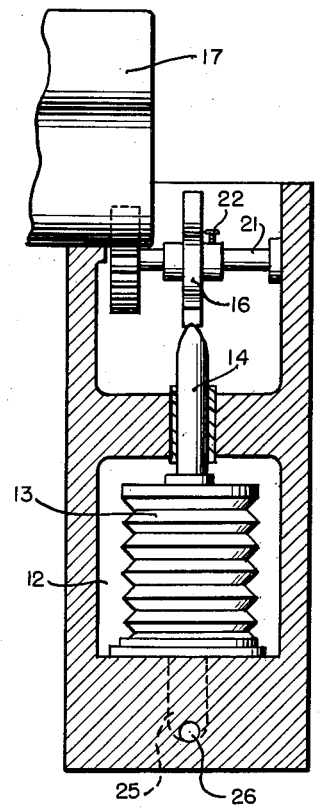
Figure 3:
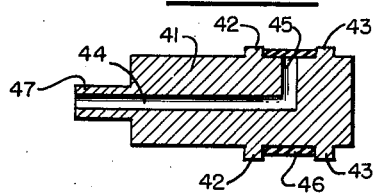
Figure 4:
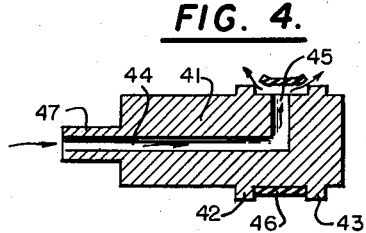
Figure 5:
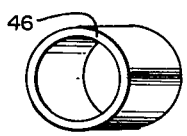

Other objects and advantages of this invention will become more apparent as the following description proceeds, which description should be considered together with the accompanying drawings, in which:

FIG. 1 is a sectional view of the pump of this invention;
FIG. 2 is a sectional view of the pump of FIG. 1 taken along the line II—II;
FIG. 3 is a sectional view of a check valve used in the pump of FIG. 1;
FIG. 4 is a sectional view of the check valve of FIG. 3 in operation; and
FIG. 5 is a perspective view of the resilient valve member of the valve of FIGS. 3 and 4.

Referring now to the drawings in detail, and in particular to FIGS. 1 and 2, reference character 11 designates a housing having an internally open portion 12 in which a bellows 13 is mounted. The bellows 13 is normally biased to its open position and has a push rod 14 having a sloped cam follower face 15 at its upper end. A spiral cam 16 is driven by a constant speed motor 17 which is mounted on the housing 11 in any suitable manner, as by screws 18, for example. The cam 16 is mounted on a shaft 21 by any common means such as by set screw 22, and the shaft 21 is supported for rotation in bearings (not shown) or in suitably sized and finished perforations in the housing 11. The cam 16 has a steep step 23, and an undercut portion 24 immediately following the step 23. The undercut 24 is preferably rounded or otherwise shaped to provide a smooth but comparatively rapid driving surface for the push rod 14.

The bellows 13 is open only at its lower end where it communicates internally by a vertical canal 25 with a passage 26 formed in the housing 11. The passage 26 may be formed from the outside and the end plugged by a screw 27 or any other removable plug. The other end of the passage 26 terminates in a lower chamber 28 formed in the body of the housing 11. A flexible and resilient diaphragm 29 having its edge 31 firmly and tightly sealed to the housing 11 separates the lower chamber 28 from an upper chamber 32. A screw 33, or other removable plug, is provided to bleed the chamber 32. An intake check valve 34 having a nipple 35 for connection to a reservoir containing the liquid to be pumped is supported in a wall of the housing 11 in communication with the upper chamber 32, and a second, exhaust check valve 36 having a nipple 37 for connection with the device receiving the liquid to be pumped is provided in a wall of the housing 11, also in communication with the upper chamber 32. To maintain simplicity in the drawings, neither the liquid reservoir nor the liquid receiving device has been illustrated but it should be understood that such containers may be of any suitable size and shape and may be connected with the appropriate nipple 35 or 37 by any standard means such as flexible tubing, pipes, or the like.

Before considering the operation of the pump, the structure and operation of the check valves 34 and 36 should be explained. A sample check valve is diagrammatically shown in FIGS. 3 and 4 and comprises a generally cylindrical body 41 of a rigid material. Two flanges 42 and 43 are formed in spaced relation on the outside surface of the body 41. A generally central passage 44 extends longitudinally within the body 41 and terminates in communication with a lateral passage 45 which connects the passage 44 with the exterior of the body 41 at a point approximately midway between the flanges 42 and 43. A tube 46, shown better in FIG. 5, of soft, resilient material is fitted, preferrably under tension, over the body 41 between the flanges 42 and 43 to effectively close the opening to the passage 45. A nipple 47 is provided for connection to other equipment.

In use the valve of FIGS. 3 and 4 is mounted so that the input is applied at the nipple 47 and the exhaust at the mouth of the passage 45. When a fluid is forced into the passage 44 at the nipple 47, the pressure within the passage 45 forces the resilient tube 46 to stretch and move away from the body 41 as shown in FIG. 4. Fluid, thus, flows through the valve in the direction of the arrows in FIG. 4. However, if fluid pressure is applied in the opposite direction, the tube 46 is pressed more firmly about the body 41, more effectively sealing the mouth of the passage 45, and preventing the flow of fluid in a direction opposite to the direction of the arrows of FIG. 4.

When the pump is to be used, the valve 34 is arranged to allow the flow of fluid into the chamber 32 and the valve 36 is arranged to permit the flow of fluid out of the chamber 32. These directions are optional, of course, since the operation of the pump is the same if the functions of the two valves 34 and 36 were reversed, but for this discussion, it will be assumed that valve 34 is an intake valve and valve 36 is the exhaust valve. The most desirable bellows 13 found so far is a metal bellows which is resilient but self-biased to its open position. Since most metals suitable for bellows construction are readily attacked chemically by many liquids, the diaphragm 29 separates the liquid being pumped from the bellows 10 and the bellows 13, canal 25, passage 26 and lower chamber 28 are filled with an innocuous, non-compressible liquid such as water, although alcohol, glycols, or the like may be used if the pump is operated at low temperatures. The water, or other liquid, may be injected by removing the screw 27, and expanding the bellows 13 to its fullest. When the bellows 13 is compressed slightly, excess liquid will be discharged through the open end of the passage 26. Then the screw 27 is replaced and the bellows released to move to its relaxed position. The diaphragm 29 should then be in a relaxed condition also.

When the bellows 13 is compressed, the water contained therein is forced in the lower chamber 28 to expand the diaphragm 29. As the diaphragm expands into the upper chamber 32, it displaces the fluid contained therein which passes out through the valve 36. Subsequent expansion of the bellows 13 withdraws water from the lower chamber 28, allowing the diaphragm 29 to relax and withdraw from the upper chamber 32. Fluid is then drawn into the upper chamber 32 through the valve 34.

The motor 17 may have a fixed, single speed and be easily replaced or may have several output speeds, any of which may be selected. In either case, the motor 17 may be an electrically powered synchronous motor, it may be a spring powered clockwork, or it may be a battery powered clockwork motor. The cam 16 may be driven at any speed suitable for the particular operation and may be within the range of from one-half revolution per hour to one revolution in each tenth of a second. As the cam 16 rotates, starting from the position shown in FIG. 1 and after the entire system has been charged, the surface of the cam 16 bears against the top of the push rod 14, gradually driving it downward and compressing the bellows 13. Water is driven from the bellows 13 at a constant rate, causing the diaphragm 29 to expand into chamber 32 at a constant rate to displace the liquid contained therein through the valve 36. At the end of a revolution, the step 23 passes the top of the push rod 14 allowing the bellows 13 to relax and withdraw water from the chamber 28. As the diaphragm 29 returns to its relaxed condition, additional liquid is drawn into the upper chamber 32 through the valve 34, and the cycle begins again. The undercut 24 is provided in the cam 16 to shorten the time during which liquid is not pumped.

Because of hysteresis, liquid is not forced out of the valve 36 as soon as the cam 16 begins depressing the push rod 14, but a finite amount of compression of the bellows is required before any liquid is pumped. If the cam 16 rotates slowly, considerable time can elapse during the initial compression of the bellows 13 before liquid is again pumped. The undercut 24 allows the bellows to "overrecover" and provides for an initial rapid compression of the bellows 13 to take up the slack after refilling. Often, during the initial charging of the upper chamber 32 with liquid, it is necessary to remove the entrapped air. Screw 33 may be removed to provide a bleed passage for this purpose.

The housing 11 may be formed of any construction material not effected by the liquid being pumped, but a transparent synthetic resin such as the acrylic resins is preferred so that the presence of entrapped gas, and operation of the device may be readily observed. The diaphragm 29 may be formed of rubber or of any other resilient film having suitable stretching characteristics. As indicated above, the most suitable general purpose bellows found is formed of metal and is self-biasing to an expanded condition. However, if more rapid expansion is desired, an internal compression spring may be used to aid the resilience of the bellows. Also, if soft materials such as synthetic resin films are used for the bellows 13, an internal spring may be required to provide an expansion force.

This application has described a new and improved positive displacement pump for displacing liquids at slow, constant rates. The pump is readily calibrated by determining the displacement of the bellows during one revolution of the driving cam. Pumping rates are easily varied by selecting the output speed of the driving motor which may be energized from a standard source of electrical energy, from batteries, from wound springs or from other suitable means for either stationary or portable operation. Since the pump positively displaces the fluid, the pumping rate is determined solely by the pump and is not subject to variations due to jars, jolts, acceleration or deceleration forces or other forms of impact and externally applied forces and the direction of gravity. The bellows should be compressible in only one direction to fully eliminate possible errors in the pumping rate due to distension and distortion of the bellows material. Due to its construction, the pump of this invention is simple in construction, yet reliable in operation with but little maintenance. It is realized that the above description may suggest to those skilled in the art other ways in which the principles of this invention may be used without departing from the spirit of the invention, and it is, therefore, intended that this invention be limited only by the scope of the appended claims.

What is claimed is:

1. A fluid pump for displacing fluids at a uniform slow rate, said pump comprising a housing having a chamber therein, a first one-way valve in communication with said chamber for allowing fluid being pumped to enter said chamber, a second one-way valve in communication with said chamber for allowing fluid being pumped to leave said chamber, a compressible body for displacing fluid from said chamber as said body is being compressed, said compressible body comprising a normally expanded bellows having a single opening in communication with said chamber, means for compressing said bellows at a uniform rate, said first and second valves each comprising a generally tubular body having a longitudinal perforation sealed at one end, a lateral passage connecting said perforation with the exterior of said body, and a flexible resilient sleeve placed in tension over said body to cover the mouth of said passage, said sleeve stretching to provide a space between the inner wall of said sleeve and the outer wall of said body when the pressure inside said passage becomes greater than the pressure outside said sleeve thereby permitting fluid to pass from within said valve to without said valve.

2. The pump defined in claim 1 further including a flexible resilient diaphragm in said chamber effectively dividing said chamber into two non-communicating vessels, said bellows being located in one of said vessels and said first and second valves being located in the other of said vessels, and a noncompressible fluid which is inert to said bellows and to said resilient diaphragm filling said bellows and said one vessel.

3. A fluid pump for dispensing fluids at a slow uniform rate, said pump comprising a hollow rigid vessel, a first check valve for permitting fluids to flow into said vessel, a second check valve for permitting fluids to flow out of said vessel, a compressible body in volume transfer relation with the interior of said vessel such that a decrease in the volume of said body effectively decreases the volume of the body-vessel combination, said body comprising a bellows having a single opening, means for connecting said single opening with the interior of said vessel so that fluids expelled from said bellows upon its compression displace fluids from said vessel in like quantities, one end of said bellows being connected to said rigid vessel and the other being movable with respect thereto, a push rod mounted on the other end of said bellows, a cam mounted to drive said push rod and compress said bellows as it is moved to drive one end of said bellows toward the other end, and a constant speed drive means adapted to drive said cam, each of said valves comprising a rigid generally tubular body having a longitudinal bore closed at one end, said tubular body having a lateral passage connecting said longitudinal bore with the exterior of said tubular body, and a sleeve of resilient material over a portion of said tubular body to cover the mouth of said passage, said sleeve stretching to provide a space between the inner wall of said sleeve and the outer wall of said tubular body when the pressure inside the passage becomes greater than the pressure outside said sleeve thereby permitting fluid to pass from within said valve to without said valve.

4. The pump defined in claim 3 further including an elastic diaphragm in said vessel effectively dividing the vessel into first and second non-communicating chambers, said first and second valves communicating with the interior of said second chamber, and a substantially non-compressible fluid filling said body and said second chamber.

5. A slow speed, low rate, continuous flow pump comprising a housing, a bellows contained within said housing, said bellows having one end open, a single passageway in said housing with one end in communication with one end of said bellows, a chamber in said housing in communication with the other end of said passageway, an inlet valve and an outlet valve, each of said inlet and outlet valves having one end in communication with said chamber, the other end of said inlet valve being adapted for connection to a source of fluid being pumped and the other end of said outlet valve being adapted for connection to a receiver of the fluid being pumped, each of said inlet and outlet valves comprising a substantially rigid tubular member having a radial perforation through the wall of said tubular member and a resilient stretchable sleeve gripping the outside of said tubular member at least over said perforation so that said sleeve stretches away from said tubular member when the pressure within the tubular member is greater than without, each of said valves being arranged with one end within and one end without said chamber, means for driving said bellows from a normally expanded condition to a collapsed condition at a slow constant rate, said drive means comprising a constant speed motor, a cam mounted to be driven by said motor and to drive said bellows, and means on said cam to compensate for hysteresis effects of said bellows when said pump recycles, said compensating means comprising a rapid change portion of said cam surface adjacent the starting point of the cam cycle.

References Cited in the file of this patent

UNITED STATES PATENTS

| 225,930 | Hoster | Mar. 30, 1880 |
| 862,867 | Eggleston | Aug. 6, 1907 |
| 1,265,153 | Winsor | May 7, 1918 |
| 1,366,151 | Astrom | Jan. 18, 1921 |
| 2,141,507 | Bourdon | Dec. 27, 1938 |
| 2,301,407 | Houser et al. | Nov. 10, 1942 |
| 2,308,974 | Harper | Jan. 19, 1943 |

FOREIGN PATENTS

| 4,941 | Great Britain | July 29, 1915 |
| 796,685 | France | Jan. 27, 1936 |